United States Patent
Furuya

(10) Patent No.: US 9,385,577 B2
(45) Date of Patent: Jul. 5, 2016

(54) AXIAL GAP-TYPE POWER GENERATOR

(71) Applicant: Fuji Jukogyo Kabushiki Kaisha, Tokyo (JP)

(72) Inventor: Akira Furuya, Tokyo (JP)

(73) Assignee: FUJI JUKOGYO KABUSHIKI KAISHA, Tokyo (JP)

(*) Notice: Subject to any disclaimer, the term of this patent is extended or adjusted under 35 U.S.C. 154(b) by 394 days.

(21) Appl. No.: 14/093,343

(22) Filed: Nov. 29, 2013

(65) Prior Publication Data
US 2014/0159517 A1 Jun. 12, 2014

(30) Foreign Application Priority Data
Dec. 11, 2012 (JP) .................. 2012-270234

(51) Int. Cl.
*H02K 5/20* (2006.01)
*H02K 16/04* (2006.01)
*H02K 5/02* (2006.01)
*H02K 21/24* (2006.01)
*H02K 3/47* (2006.01)
*H02K 7/18* (2006.01)
*F02B 63/04* (2006.01)

(52) U.S. Cl.
CPC .............. *H02K 16/04* (2013.01); *F02B 63/048* (2013.01); *H02K 3/47* (2013.01); *H02K 5/02* (2013.01); *H02K 5/20* (2013.01); *H02K 7/1815* (2013.01); *H02K 21/24* (2013.01)

(58) Field of Classification Search
None
See application file for complete search history.

(56) References Cited

U.S. PATENT DOCUMENTS

| | | | | |
|---|---|---|---|---|
| 3,979,619 A * | 9/1976 | Whiteley | ............... | H01F 7/021 310/154.06 |
| 4,429,240 A * | 1/1984 | Kishi | ..................... | H02K 1/06 310/156.32 |
| 5,646,467 A * | 7/1997 | Floresta | ................. | H02K 1/17 310/154.05 |
| 5,907,199 A * | 5/1999 | Miller | ..................... | H02K 16/04 310/112 |
| 6,483,213 B1 * | 11/2002 | Hsu | ....................... | H02K 3/522 310/68 R |
| 7,042,109 B2 * | 5/2006 | Gabrys | ................... | F03D 9/002 290/44 |
| 7,692,356 B2 * | 4/2010 | Bott | ....................... | H02K 3/522 310/260 |
| 2009/0273248 A1 * | 11/2009 | Schwaiger | ............ | H02K 3/522 310/71 |

FOREIGN PATENT DOCUMENTS

| JP | H 04-133648 A | 5/1992 |
|---|---|---|
| JP | H 07-059288 A | 3/1995 |
| JP | 10-004650 A | 1/1998 |

(Continued)

OTHER PUBLICATIONS

JPO Decision to Grant a Patent dated Jun. 23, 2015.

(Continued)

*Primary Examiner* — Tran Nguyen
(74) *Attorney, Agent, or Firm* — McGinn IP Law Group, PLLC

(57) ABSTRACT

An axial gap-type power generator has: a rotor fixed to a crankshaft of an engine; a stator fixed to a crankcase of the engine and opposing the rotor across a spacing in an axial direction; and a housing to house the rotor and the stator and to fix the stator. The stator is configured by arraying, in a peripheral direction, a plurality of coils C each configured through winding of a winding about a stator core. The housing is formed of a resin-based material. Winding ends of the coils are wired using connector fittings each of which is formed of a metal plate, is held on the housing, and has a clamp into which the winding end is inserted and clamped.

6 Claims, 11 Drawing Sheets

(56) References Cited

FOREIGN PATENT DOCUMENTS

| | | |
|---|---|---|
| JP | 2004-048908 A | 2/2004 |
| JP | 2008-259259 A | 10/2008 |
| JP | 2008-295211 A | 12/2008 |
| JP | 2009-216014 A | 9/2009 |
| JP | 2010-154701 A | 7/2010 |
| JP | 2010-239807 A | 10/2010 |

OTHER PUBLICATIONS

JPO Notification of Reason for Refusal dated Oct. 21, 2014.

* cited by examiner

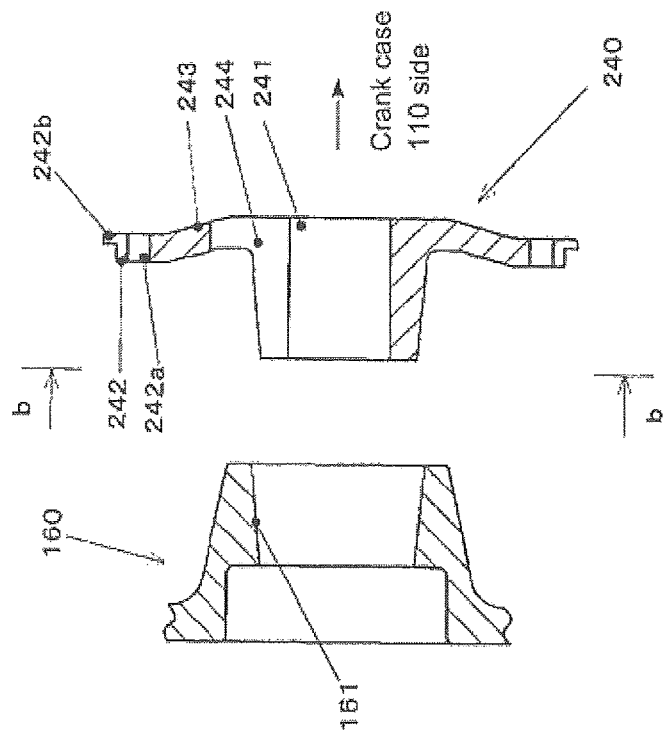
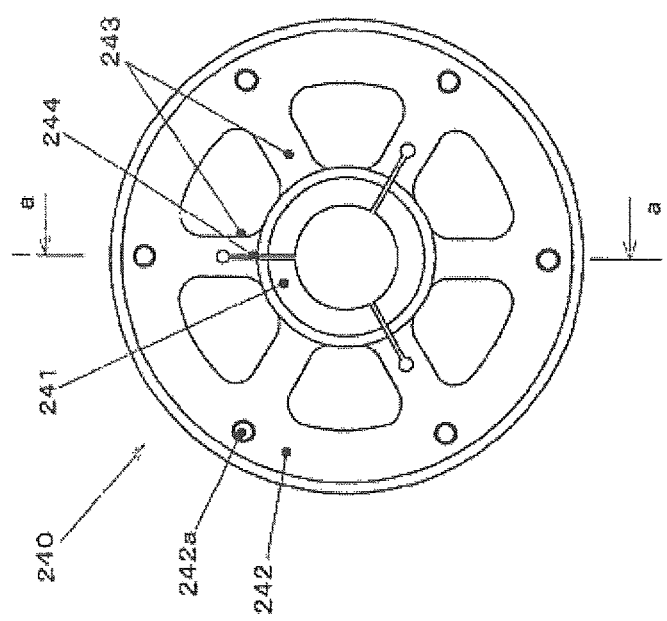
Fig. 5A
Fig. 5B

AXIAL GAP-TYPE POWER GENERATOR

CROSS-REFERENCE TO RELATED APPLICATIONS

The present application claims priority from Japanese Patent Application No. 2012-270234 filed on Dec. 11, 2012, the entire contents of which are hereby incorporated by reference.

BACKGROUND

1. Technical Field

The present invention relates to an axial gap-type power generator which is driven by a general-purpose engine, and in which rotor and stators are disposed opposing each other in the axial direction. More particularly, the present invention relates to an axial gap-type power generator in which electric wiring is configured in a simple and compact manner.

2. Related Art

Connecting a power generator to one end of a crankshaft that protrudes from an engine body is a known feature in, for instance, general-purpose engines for industrial use.

For instance, Japanese Unexamined Patent Application Publication (JP-A) No. H10-4650 discloses the feature of providing power generation magnets in a flywheel that is fixed to a crankshaft end of a motorcycle engine, and providing power generation coils, which are fixed to the engine, at locations opposing these magnets in the radial direction.

In order to achieve power generators of compact configuration, it has been proposed in recent years to use axial gap-type power generators in which a stator core provided with power generation coils and fixed to an engine, and a rotor yoke provided with power generation magnets and that rotates together with a crankshaft, are disposed opposing each other in the center axis direction of the crankshaft.

For instance, JP-A No. 2009-216014 discloses an axial gap-type power generator in which a stator core that is fixed to an engine is disposed in the spacing between a pair of rotor yokes that are disposed protruding from a crankshaft towards the outer diameter side and that are disposed spaced apart from each other in the axial direction.

The housing (chassis) of conventional axial gap-type power generators has been ordinarily formed using for instance an aluminum-based alloy that exhibits high thermal conductivity and that is advantageous in terms of cooling performance.

However, electric wiring having undergone some insulating treatment, for instance PVC-coated wiring, must be resorted to, and substantial space is likewise required in cases where such a metallic housing is utilized. As a result, it has been difficult to achieve compact designs.

Wiring splicing, moreover, requires soldering, brazing or the like of wires from which the PVC coating has been stripped. This entailed accordingly a complex production process and was a factor that drove costs up.

SUMMARY OF THE INVENTION

In the light of the above, it is an object of the present invention to provide an axial gap-type power generator in which electric wiring is configured in a simple and compact manner.

The above object is attained by virtue of the means set forth below.

A first aspect of the present invention provides an axial gap-type power generator including: a rotor fixed to a crankshaft of an engine; a stator fixed to a crankcase of the engine, and opposing the rotor across a spacing in an axial direction; and a housing to house the rotor and the stator and to fix the stator. The stator is configured by arraying, in a peripheral direction, a plurality of coils each configured through winding of a winding about a stator core. The housing is formed of a resin-based material Winding ends of the coils are wired using connector fittings each of which is formed of a metal plate, is held on the housing, and has a clamp into which the winding end is inserted and clamped.

The coils may be connected to each other through insertion of a winding end of one coil into one clamp of each connector fitting that has clamps at both ends, and through insertion of a winding end of another coil to another clamp.

The stator may have a first stator and a second stator that are disposed flanking the rotor in a rotation axial direction. The housing may be configured by combining a first member for holding the first stator and a second member for holding the second stator. An electric circuit provided on the side of the first member and an electric circuit provided on the side of the second member may be wired to each other by way of a connector that is formed integrally with a joint of the first member and the second member.

The connector fittings may be fitted in recesses that are respectively formed in an inner face side and an outer face side of the housing.

BRIEF DESCRIPTION OF THE DRAWINGS

FIGS. 5A and 5B are diagram illustrating an adapter that connects a crankshaft and a rotor and flywheel in the power generator of FIG. 1;

DETAILED DESCRIPTION

The present invention attained the above object, of providing an axial gap-type power generator in which electric wiring is configured in a simple and compact manner, by producing the housing of a power generator out of a resin, and through fitting of connector fittings each having a clamp for clamping an end of a coil winding.

Implementation

An implementation of an axial gap-type power generator in which the present invention is utilized will be explained next.

Figure 1:
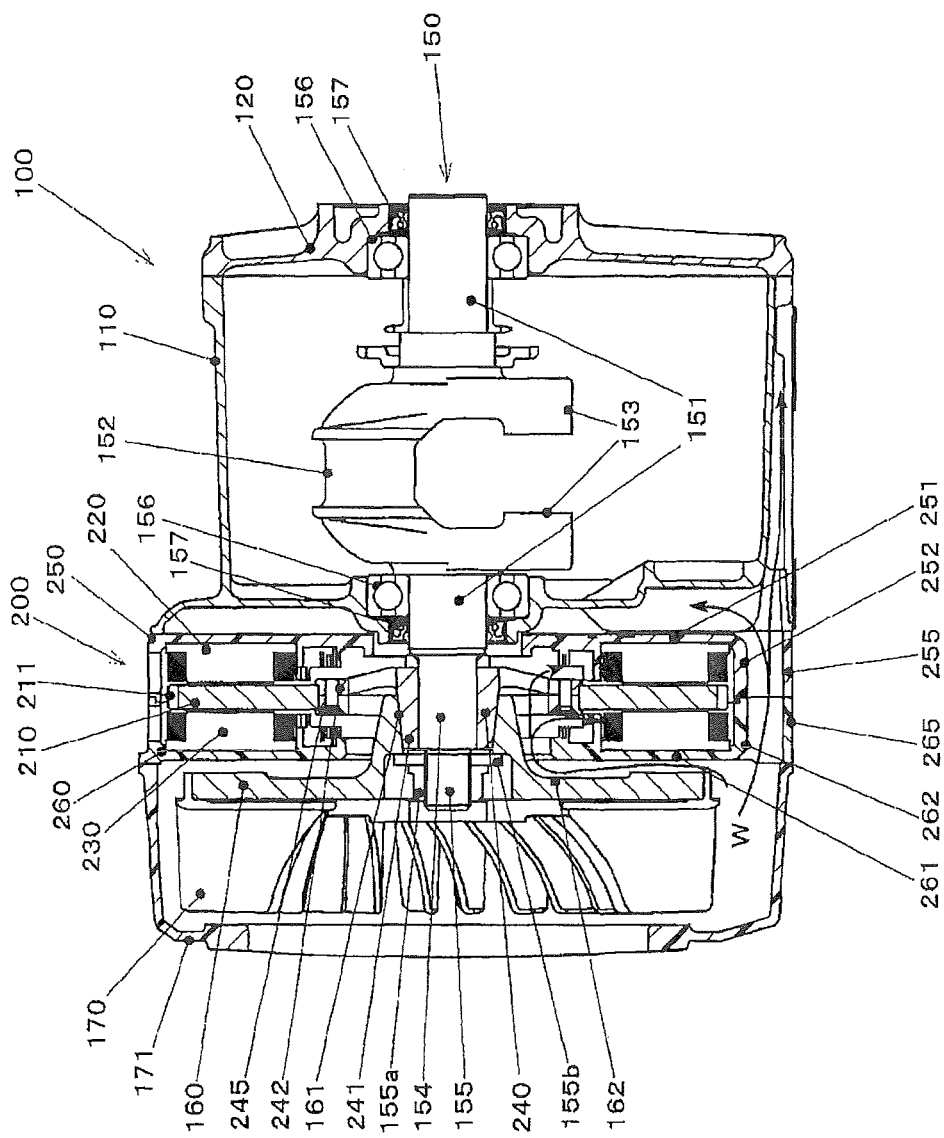
FIG. 1 is a cross-sectional diagram of an engine, having an implementation of an axial gap-type power generator in which the present invention is used, as viewed cut across a vertical plane that includes a center axis of a crankshaft.

FIG. 1 is a cross-sectional diagram of an axial gap-type power generator and an engine of an implementation, as viewed cut across a vertical plane that includes a center axis of a crankshaft.

Figure 2:
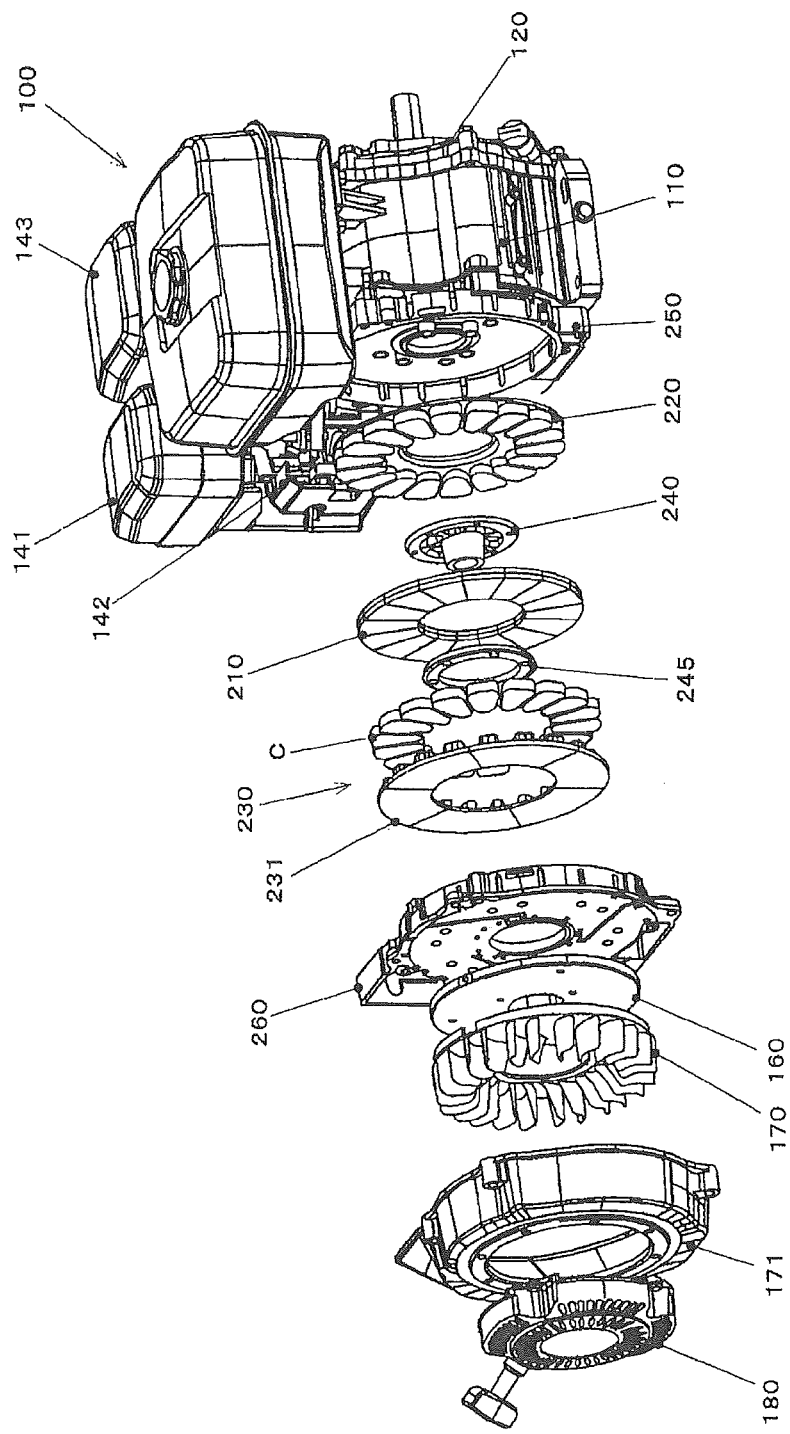
FIG. 2 is an exploded perspective-view diagram of the engine and power generator of FIG. 1.

FIG. 2 is an exploded perspective-view diagram of the engine and power generator of FIG. 2.

An engine 100, which is for instance a single-cylinder, four-stroke OHC general-purpose gasoline engine, is provided with an axial gap-type power generator 200.

Figure 10:
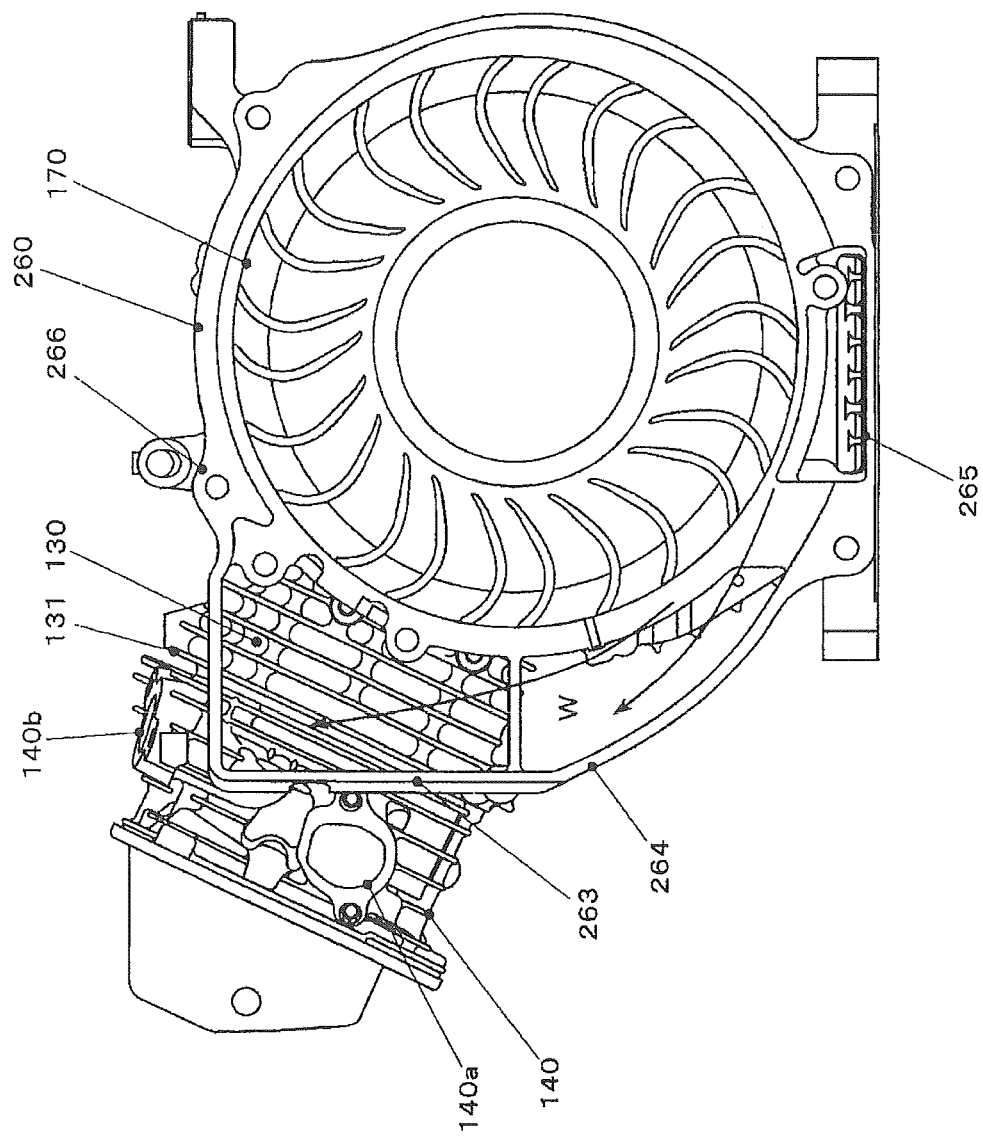
FIG. 10 is a diagram illustrating the engine and power generator of FIG. 1, with a blower housing and so forth removed therefrom, as viewed from a blower fan side.

The engine 100 is configured by having, for instance, a crankcase 110, a main bearing cover 120, a cylinder 130, a cylinder head 140, a crankshaft 150, a flywheel 160, a blower fan 170 and a recoil starter 180. (The cylinder 130 and the cylinder head 140 are depicted in FIG. 10.)

The crankcase 110 is a container-like portion that houses the crankshaft 150 and so forth.

The crankcase 110 is formed, for instance out of an aluminum-based alloy casting, integrally with the cylinder 130.

An opening that is blocked by the main bearing cover 120 is formed at an end of the crankcase 110 on the side opposite that of the power generator 200.

The main bearing cover 120 is a lid-like member that blocks the opening of the crankcase 110.

The cylinder 130, which is a cylindrical portion into which a piston is inserted, is integrally formed with the crankcase 110.

The center axis of the cylinder 130 is obliquely disposed in such a manner that the cylinder head side is higher than the crankcase side.

A plurality of fins 131 for cooling is formed on the outer peripheral face of the cylinder 130.

The cylinder head 140 is provided at an end of the cylinder 130, on the side opposite that of the crankcase 110.

The cylinder head 140 constitutes a piston crown surface and a combustion chamber of the cylinder 130.

On the cylinder head 140 there are provided, for instance, a spark plug, an intake port 140a, an exhaust port 140b, valves for opening and closing these ports, as well as a drive system of the valves.

As illustrated in FIG. 2, an air cleaner 141 and a carburetor 142 are connected to the intake port.

The purpose of the air cleaner 141 is to introduce air for combustion (fresh air), and to filter the air, to remove dust and the like therefrom.

The purpose of the carburetor 142 is to supply a fuel spray to the fresh air that is introduced from the air cleaner 141, and to form thereby an air-fuel mixture.

The carburetor 142 is provided with a throttle valve that adjusts the flow rate of the fresh air.

A muffler 143 is an exhaust pipe, connected to the exhaust port, such that the acoustic energy of burned gas (exhaust gas) is reduced in the muffler 143, and the gas is discharged through the muffler 143 towards the exterior.

The crankshaft 150, which is an output shaft of the engine 100, has for instance a journal 151, a crank pin 152, a crank web 153, an output shaft 154, a screw 155 and so forth, and is further provided with a main bearing 156, an oil seal 157 and so forth.

The journal 151 is a shaft section that is rotatably supported on the crankcase 110 and the main bearing cover 120.

The journal 151 is supported, by way of the main bearing 156, on the crankcase 110 and the main bearing cover 120.

An oil seal 157 is provided contiguously to the main bearing 156, outside the crankcase 110, in order to prevent leakage of oil from the interior of the crankcase 110.

The crank pin 152 is a portion to which there is connected a connecting rod that transmits forces between the piston and the crankshaft 150, and is formed in the shape of a shaft that is eccentric with respect to the journal 151.

The crank web 153 has integrally formed therein a crank arm that connects the journal 151 and the crank pin 152, as well as crank weights that are disposed to be substantially axial-symmetric with respect to the crank arm.

The output shaft 154 is a shaft, formed protruding from the crankcase 110, and to which there is connected an adapter 240 that is a coupling member of the below-described axial gap-type power generator 200.

The output shaft 154 is a parallel shaft having substantially a uniform outer diameter along the entire length thereof.

The output shaft 154 is formed in such a manner that the outer diameter thereof decreases step-wise with respect to the journal 151. As a result, a step having a face that is substantially perpendicular to the rotation axis is formed at a boundary between the journal 151 and the output shaft 154 (at the end of the journal 151 on the output shaft 154 side).

This step is used for clamping of a below-described shim S.

The screw 155 is a portion formed protruding from the end of the output shaft 154, and to which a washer 155b and a nut 155a are fastened.

The screw 155 is formed in such a manner that the outer diameter thereof decreases step-wise with respect to the output shaft 154. As a result, a step having a face that is substantially perpendicular to the rotation axis is formed at a boundary between the screw 155 and the output shaft 154 (at the end of the output shaft 154 on the screw 155 side).

The flywheel 160, which is a disc-like member that is attached to the output shaft 154 by way of the adapter 240 of the power generator 200, is a rotating body mass that curtails torque fluctuations of the engine.

A tapered bore 161 to which the adapter 240 of the below-described power generator 200 is attached, is formed in the central portion of the flywheel 160.

A recess 162 is provided in the central portion of the flywheel 160, on the face on the crankcase 100 side. The recess 162 is formed in such a manner that the thickness of the flywheel 160 becomes smaller than that at the periphery.

The recess 162 functions also as a channel for cooling air W that flows from the outer peripheral side to the inner peripheral side of the flywheel 160, and that is introduced thereafter into the power generator 200.

This feature will be explained in detail further on.

The blower fan 170 is provided with a plurality of vanes that are attached to the flywheel 160, on the side opposite the crankcase 110 side, such that the vanes blow air that is taken in from the central portion side towards the outer diameter side.

Around the blower fan 170 there is provided a blower housing 171 that covers the blower fan 170 and that guides the generated cooling air W to a predetermined channel.

The purpose of the recoil starter 180, which is provided adjacent to the blower housing 171, is to enable a user to start the engine up.

The power generator 200 is driven by the engine 100 and generates power. The power generator 200 is an axial gap-type power generator in which a rotor 210 and stators 220 and 230 are disposed opposing each other in the axial direction.

The power generator 200 is configured by comprising, for instance, the rotor 210, a first stator 220, a second stator 230, the adapter 240, a first housing 250 and a second housing 260.

The rotor 210 is fixed to the output shaft 154 of the crankshaft 150 by way of the adapter 240 and rotates together with the crankshaft 150.

The rotor 210 is a flat plate-like disc, having a circular opening at a central portion, made up of a magnetic body. The rotor 210 is NS-magnetized according to a predetermined pattern.

A circular ring-like protective ring 211 is fixed to the outer peripheral edge of the rotor 210, in order to prevent fragments from flying off, on account of centrifugal forces, upon occurrence of cracks or the like.

The first stator 220, which is provided on the engine 100 side of the rotor 210, comprises a plurality of coils C that oppose the surface of the rotor 210 with a small spacing in between.

The first stator 220 is fixed to the crankcase 110 of the engine 100 by way of the first housing 250.

Figure 3:
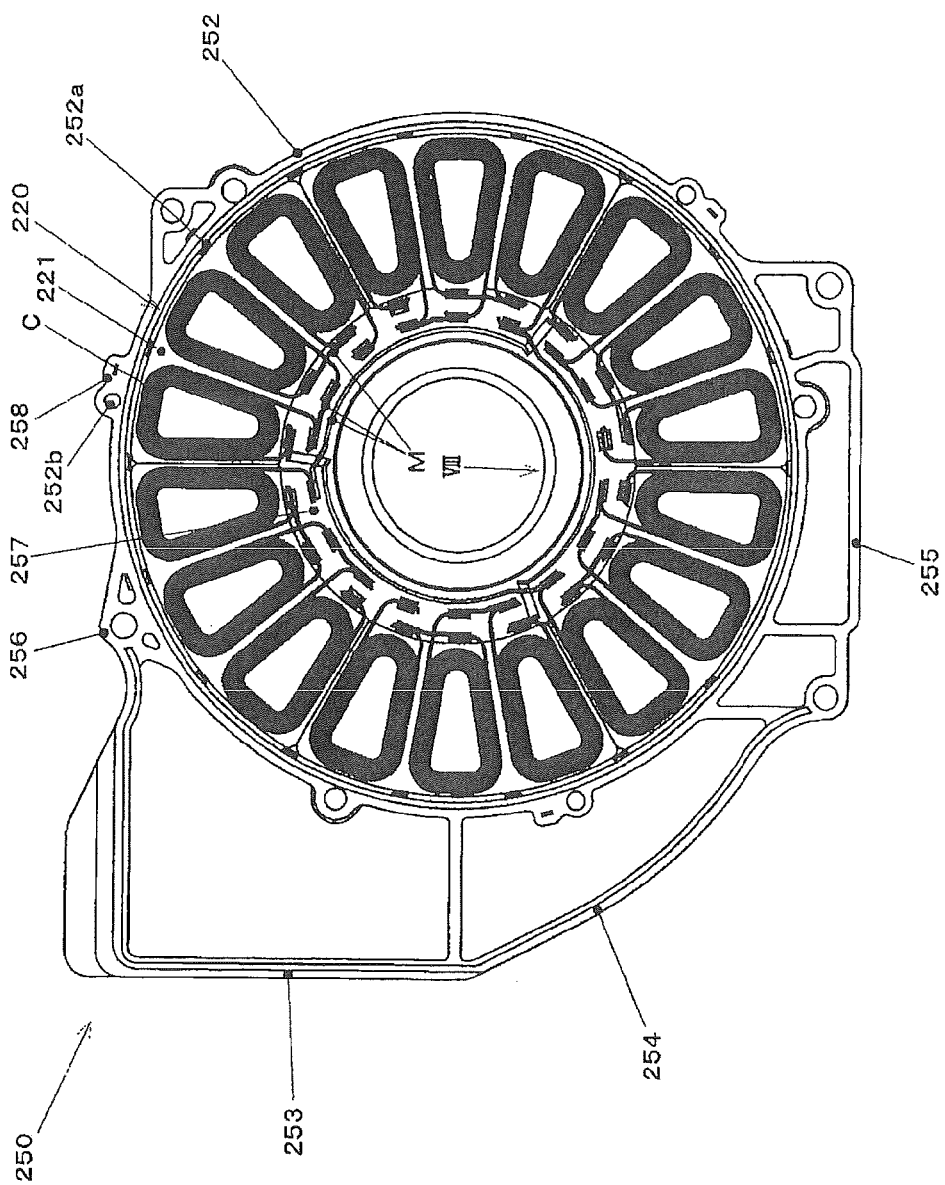
FIG. 3 is a diagram illustrating a first stator and a first housing of the power generator of FIG. 1, as viewed from a rotor.

FIG. 3 illustrates the first stator, which is attached to the first housing, as viewed from the rotor.

The first stator 220 is configured, for instance, through arraying of 18 coils C along the peripheral direction.

Each coil C is formed, for instance, through winding of a flat wire, made of copper, around an iron core (stator core) that is formed to a fan-shape.

Both ends of the flat wire that is a winding of each of the coils C are drawn out from the inner peripheral side of the first stator 220, and are disposed offset from each other in the rotation axial direction of the crankshaft 150.

The coils C are grouped into three phases, a U-phase, a V-phase and a W-phase, such that three adjacent coils C are of the same phase. These three same-phase coils C are fixed to a respective fan-shaped holding plate 221. A gap through which cooling air flows is provided in the spacing between adjacent coils C.

The first stator 220 is configured through ring-like connection of six units, each of which is an assembly of three coils C, onto such a holding plate 221.

The second stator 230, which is provided on the rotor 210, on a side opposite the engine 100 side, comprises a plurality of coils C that oppose the surface of the rotor 210, with a small spacing in between.

The second stator 230 is configured substantially in the same way as the above-described first stator 220.

The second stator 220 is fixed to the crankcase 110 of the engine 100 by way of the second housing 260 that makes up the chassis of the power generator 200 by being connected to the first housing 250.

Figure 4:
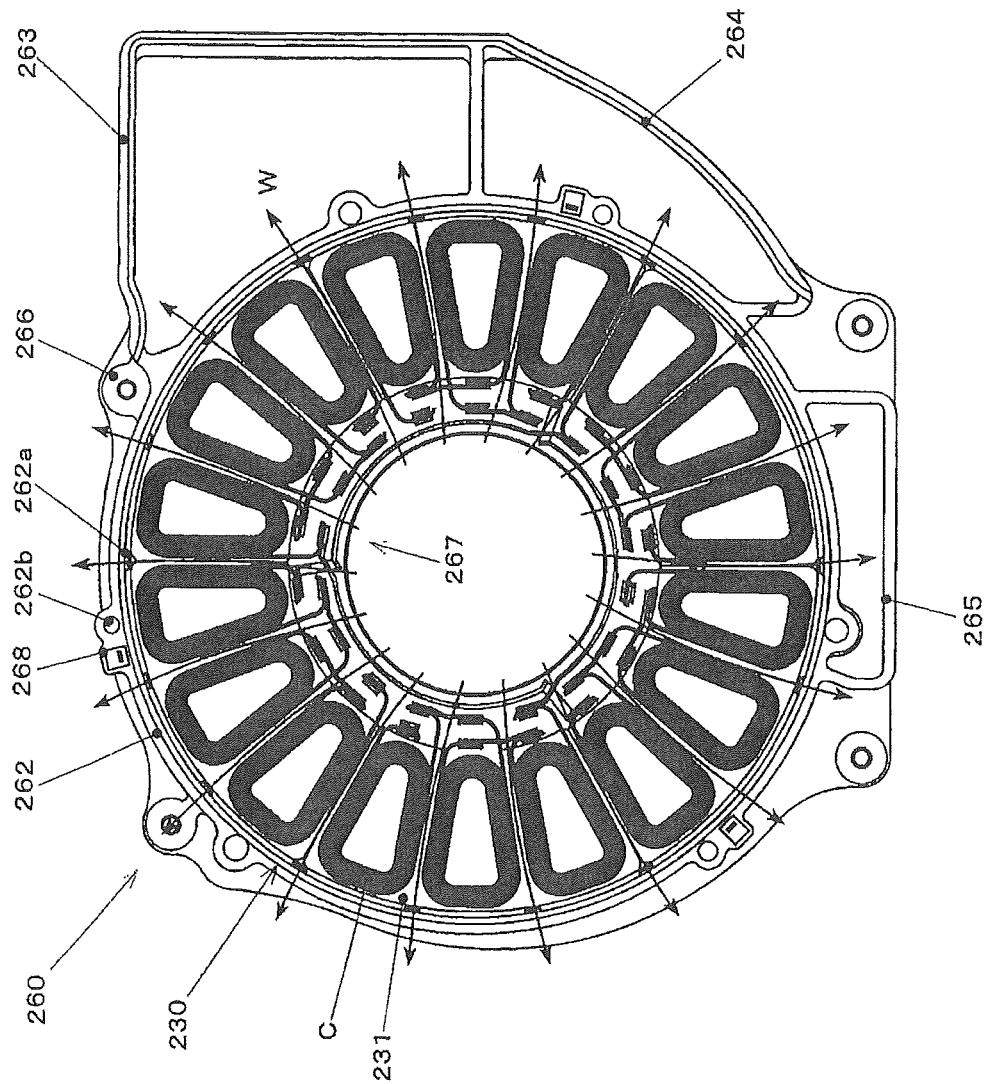
FIG. 4 is a diagram illustrating a second stator and a second housing of the power generator of FIG. 1, as viewed from a rotor.

FIG. 4 is a diagram illustrating the second stator, attached to the second housing, as viewed from the rotor.

The adapter 240, which is connected to the output shaft 154 of the crankshaft 150, is a member to which the rotor 210 and the flywheel 160 are fixed.

FIGS. 5A and 5B are diagrams illustrating the adapter 240.

FIG. 5A is an exploded cross-sectional diagram of the adapter 240 and the periphery of the mounting section of the flywheel 160 and the adapter 240, as viewed cut across a plane that includes the center axis of the adapter 240.

FIG. 5B is a b-b arrow-view diagram of FIG. 5A, being a front-view diagram of the adapter 240, as viewed from the side of the flywheel 160.

Figure 6:
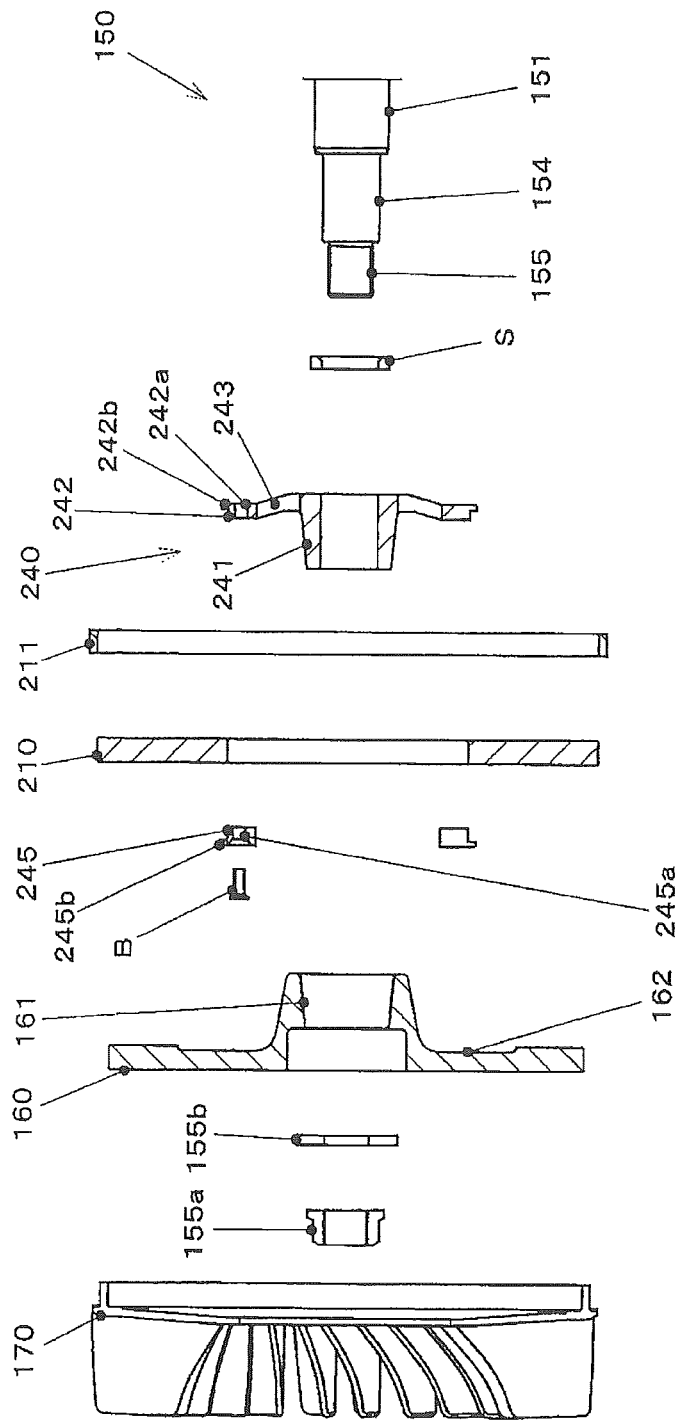
FIG. 6 is an exploded cross-sectional diagram of components in the periphery of the adapter of FIGS. 5A and 5B, as viewed cut across a plane that includes a rotation center axis.

FIG. 6 is an exploded cross-sectional diagram of components in the periphery of the adapter, as viewed cut across a plane that includes the rotation center axis.

A tubular section 241, a rotor mounting section 242, spokes 243 and so forth are integrally formed to configure thereby the adapter 240.

The tubular section 241 is a portion into which the output shaft 154 of the crankshaft 150 is inserted.

The inner diameter of the tubular section 241 is uniform along substantially the entire length, and is set to be greater than the outer diameter of the output shaft 154 by a necessary gap that arises inevitably upon insertion.

The outer diameter of the tubular section 241 is formed to a tapered shape such that the outer diameter increases gradually from the flywheel 160 side towards the crankcase 100 side.

This tapered section has a taper angle that is substantially identical to that of the opening 161 of the flywheel 160.

The end face of the crankcase 110 side of the tubular section 241 is disposed so as to oppose a step (end face) that is formed at the end of the output shaft 154 of the crankshaft 150. As the case may require, a ring-like shim S is tucked in between the steps of the foregoing end faces, in order to adjust the gap between the rotor 210 and the stators 220 and 230.

The rotor mounting section 242 is formed as a substantially flat disc-like shape having a circular opening at the central portion.

The inner peripheral edge of the rotor mounting section 242 is disposed spaced apart, in the radial direction, from the outer peripheral face of the tubular section 241, in the vicinity of the end thereof on the crankcase 110 side.

Screw holes 242a to which the below-described rotor holding ring 245 is fastened are formed in the rotor mounting section 242.

The screw holes 242a are provided, for instance, at six sites distributed in the peripheral direction of the rotor mounting section 242.

A flange 242b that holds the inner peripheral edge of the rotor 210 is formed at the edge, on the crankcase 110 side, of the outer peripheral edge of the rotor mounting section 242, the flange 242b being formed so as to jut out, collar-like, on the outer diameter side.

The spokes 243 are portions that connect the inner peripheral edge of the rotor mounting section 242 and the end of the tubular section 241 on the crankcase 100 side. The spokes 243 are radially disposed at six sites on the periphery of the adapter 240.

Openings that allow the cooling air W to pass through are formed at spacings between the spokes 243.

The tubular section 241 has formed therein notches 244 that are provided along the entire length of the latter, substantially parallelly to the center axis.

Each notch 244 is formed through cutting, in the radial direction, of the peripheral wall of the tubular section 241, such that the tubular section 241 is divided by the notches 244.

Part of each notch 244 extends to part of an adjacent spoke 243.

Each notch 244 is formed so as to have a small spacing, in a state where no external force is acting on the adapter 240.

The notches 244 are disposed at three substantially equidistant sites on the peripheral direction of the adapter 240.

The tubular section 241 is inserted into the tapered bore 161 that is formed in the flywheel 160.

When in this state the flywheel 160 is fastened to the screw 155 of the crankshaft 150, using the nut 155a, the outer peripheral face of the tubular section 241 becomes pressed against the inner peripheral face of the tapered bore 161; as a result, the tubular section 241 deforms so as to become narrower in that the inner diameter thereof decreases.

As a result of this deformation, the inner peripheral face of the tubular section 241 becomes firmly crimped onto the outer peripheral face of the output shaft 154 of the crankshaft 150.

A rotation stop that comprises, for instance, a key, a key groove and the like, can be provided, as needed, between the inner peripheral face of the tubular section 241 and the outer peripheral face of the output shaft 154, and between the outer peripheral face of the tubular section 241 and the inner peripheral face of the tapered bore 161.

Providing such a rotation stop allows preventing detected phase offset in a case where there is provided a crank position detector that is used for ignition signal generation in the flywheel.

As illustrated in FIG. 6, the rotor holding ring 245 is attached to a face of the rotor mounting section 242 on the flywheel 160 side.

The rotor holding ring 245 is a member that holds the inner peripheral edge of the rotor 210 in concert with the rotor mounting section 242.

The rotor holding ring 245 is a plate-like member formed in the shape of a ring, and has an outer diameter and inner diameter substantially identical to those of the rotor mounting section 242.

An opening 245a, through which there is inserted a screw B that is used for fastening with the rotor mounting section 242, is formed in the rotor holding ring 245.

A flange 245b that holds the inner peripheral edge of the rotor 210 is formed at the edge, on the flywheel 160 side, of the outer peripheral edge of the rotor holding ring 245, the flange 245b being formed so as to jut out, collar-like, on the outer diameter side.

The flange 242b and the flange 245b are disposed opposing each across the inner peripheral edge of the rotor 210.

The material of the magnetic body that makes up the rotor 210 is brittle, and it is thus undesirable that the material be subjected to strong compressive loads. Accordingly, the spacing between the flanges 242b, 245b is formed so as to be slightly larger than the thickness of the rotor 210. An elastic adhesive is packed into the gap that is formed between the flanges 242b, 245b and the rotor 210.

Likewise, an adhesive is packed into the small spacing between the inner peripheral face of the rotor 210 and the outer peripheral faces of the rotor mounting section 242 and the rotor holding ring 245.

The first housing 250 and the second housing 260 are holding members that hold the first stator 220 and the second stator 230, respectively, and that make up together the chassis of the power generator 200.

The first housing 250 and the second housing 260 are integrally formed, through injection molding, using a resin-based material such as a heat-resistant nylon resin.

Strength is required in the first housing 250 and the second housing 260, since these are acted upon by part of the output torque of the engine. Accordingly, a reinforcing material such as glass fibers or the like is added, as needed, to the resin material.

Figure 7:
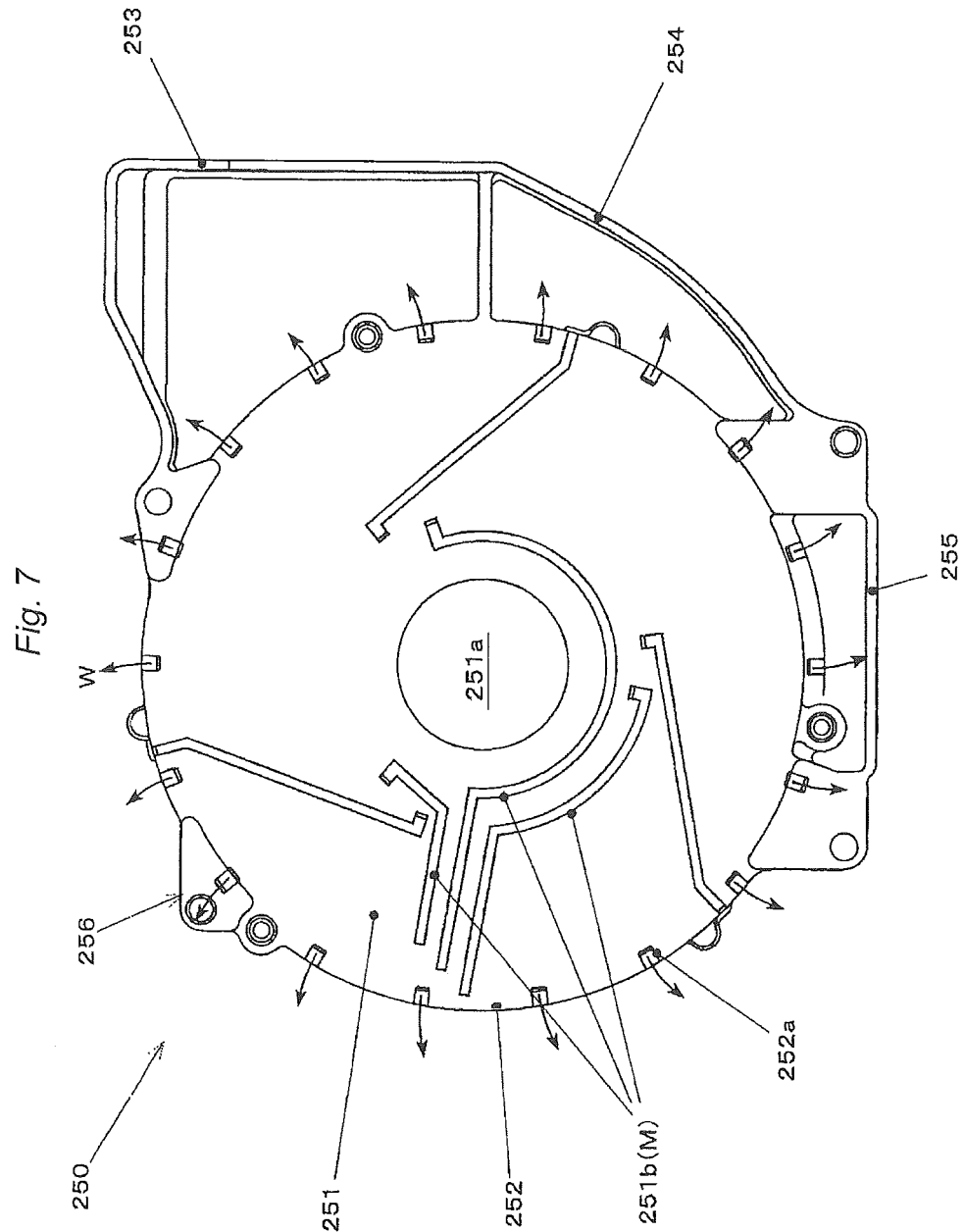
FIG. 7 is a diagram illustrating a first housing of the power generator of FIG. 1, as viewed from a crankcase side.

FIG. 7 is a diagram illustrating the first housing 250, as viewed from the crankcase 110 side.

The first housing 250 is configured by having a disc 251, a peripheral wall 252, a first duct 253, a second duct 254, a third duct 255, fasteners 256, connector fitting holders 257 and connectors 258 (FIG. 3).

As illustrated in FIG. 1 and so forth, the disc 251 is formed to a flat plate-like shape that is perpendicular to the center axis of the crankshaft 150.

The disc 251 is disposed opposing the face of the crankcase 110 on the power generator 200 side, with a gap therebetween so as to enable cooling air to pass.

As illustrated in FIG. 7, the disc 251 has an opening 251a, grooves 251b and so forth.

The opening 251a, which is a circular opening that is formed in a central portion of the disc 251, is a portion into which the output shaft 154 and so forth of the crankshaft 150 is inserted.

The grooves 251b have embedded therein respective connector fittings M being plate-like fittings that constitute the output wiring from the first stator 220.

The peripheral wall 252 is a cylindrical portion formed jutting out from the outer peripheral edge of the disc 251, towards the second housing 260, and that covers the outer peripheral side of the first stator 220.

Slits 252a through which cooling air passes are formed in the peripheral wall 252.

The slits 252a are disposed in such a manner that the positions thereof in the peripheral direction match substantially the gaps with respective coils C, so that the flow of cooling air that passes radially between the coils C of the first stator 220 is not obstructed.

The ends of the slits 252a are formed wrapping around up to the outer peripheral edge of the disc 251.

The first duct 253, the second duct 254 and the third duct 255 are air channels, provided each on the outer diameter side of the peripheral wall 252, and that guide cooling air generated by the blower fan 170 to respective dissimilar sites of the engine 100.

The first duct 263, the second duct 264 and the third duct 265 of the second housing 260 are respectively connected to the first duct 253, the second duct 254 and the third duct 255, in such a manner that cooling air from the second housing 260 flows towards the engine 100.

The first duct 253, the second duct 254 and the third duct 255 are explained in detail further on.

Each fastener 256 is a portion for fastening the first housing 250 to the crankcase 110, and has therein a hole into which a bolt for fastening is inserted.

The fasteners 256 are disposed distributed in the peripheral direction, at two sites at the top and bottom of the first housing 250.

As illustrated in FIG. 3, the connector fitting holder 257 is provided on the second stator 220 side (inside the housing) of the inner peripheral edge of the disc 251.

Figure 8:
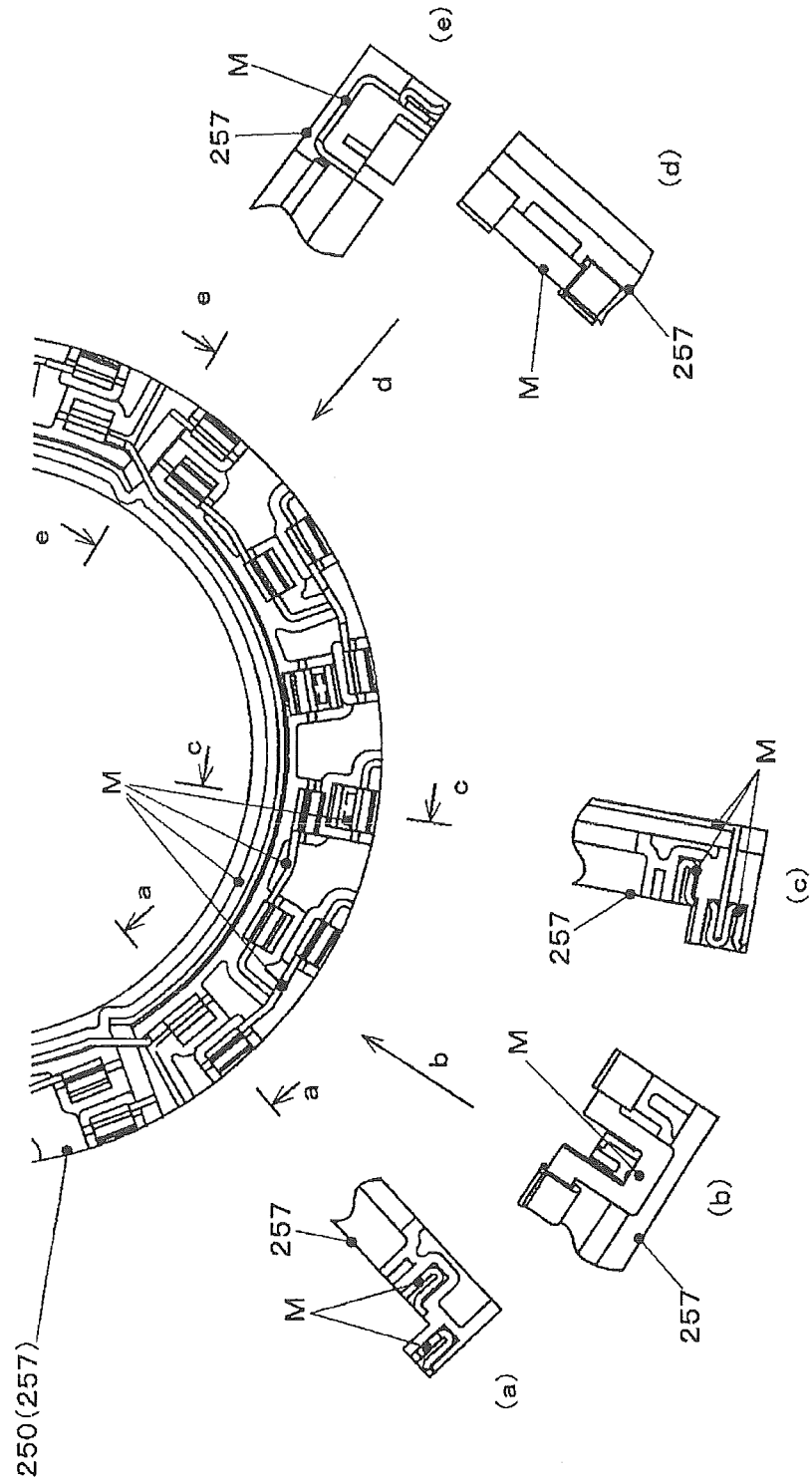
FIG. 8 is an enlarged view diagram of a VIII section of FIG. 3.

FIG. 8 is a set of enlarged view diagrams of the periphery of the connector fitting holder, being enlarged view diagrams of section VIII of FIG. 3.

FIG. 8A through FIG. 8E are arrow-view diagrams illustrating sections a-a through e-e in the main diagram of FIG. 8.

The coils C of the first stator 220 are all wired to each other by the connector fittings M.

Each connector fitting M is configured by having a pair of clips that are integrally formed through punching of a metal plate to a predetermined shape, followed by bending, such that a respective flat wire (winding end) that is led out from each of the coils C is inserted in each clip, and by having a connecting section that connects the clips.

The positional relationship between the clips, and the shape of the connecting section, are set in each connector fitting M in such a manner that the coils C can be wired to each other according to a predetermined connecting-wire pattern.

Each connector fitting M is fixed to the first housing 250 by fitting in a groove that is formed in a respective connector fitting holder 257.

The flat wires of the respective coils C of the first stator 220 are inserted, along the axial direction of the power generator, in the clips of the connector fitting M, in a state where each connector fitting M is fitted in a predetermined groove; as a result, all the coils C of the first stator 220 become wired so as to make up a predetermined circuit.

As illustrated in FIG. 8C, some of the connector fittings M are wrapped around the outer side of the disc 251 (crankcase 110 side), and are fitted into the grooves 251b of the disc 251, to be used thereby for conduction with the exterior of the power generator 200.

Some of the connector fittings M are used for conduction with the connector fittings M that are provided on the second housing 260 side.

The terminals of such connector fittings M are disposed, as illustrated in FIG. 3, protruding beyond the connectors 258 that are provided on the end face, on the second housing 260 side, of the peripheral wall 252 of the first housing 250.

Through closing of the first housing 250 and the second housing 260 to each other, the protruding terminals are inserted in the clips provided in the second housing 260 side; conduction is secured and wire connection is established thereby.

Projections 252b for positioning and protecting the terminals are formed adjacent to the terminals, at the end face of the peripheral wall 252, on the first housing 250 side.

Recesses 262b into which the projections 252b are inserted are formed in connectors 268 that are provided on the end face of the peripheral wall 262, on the second housing 260 side.

Figure 9:
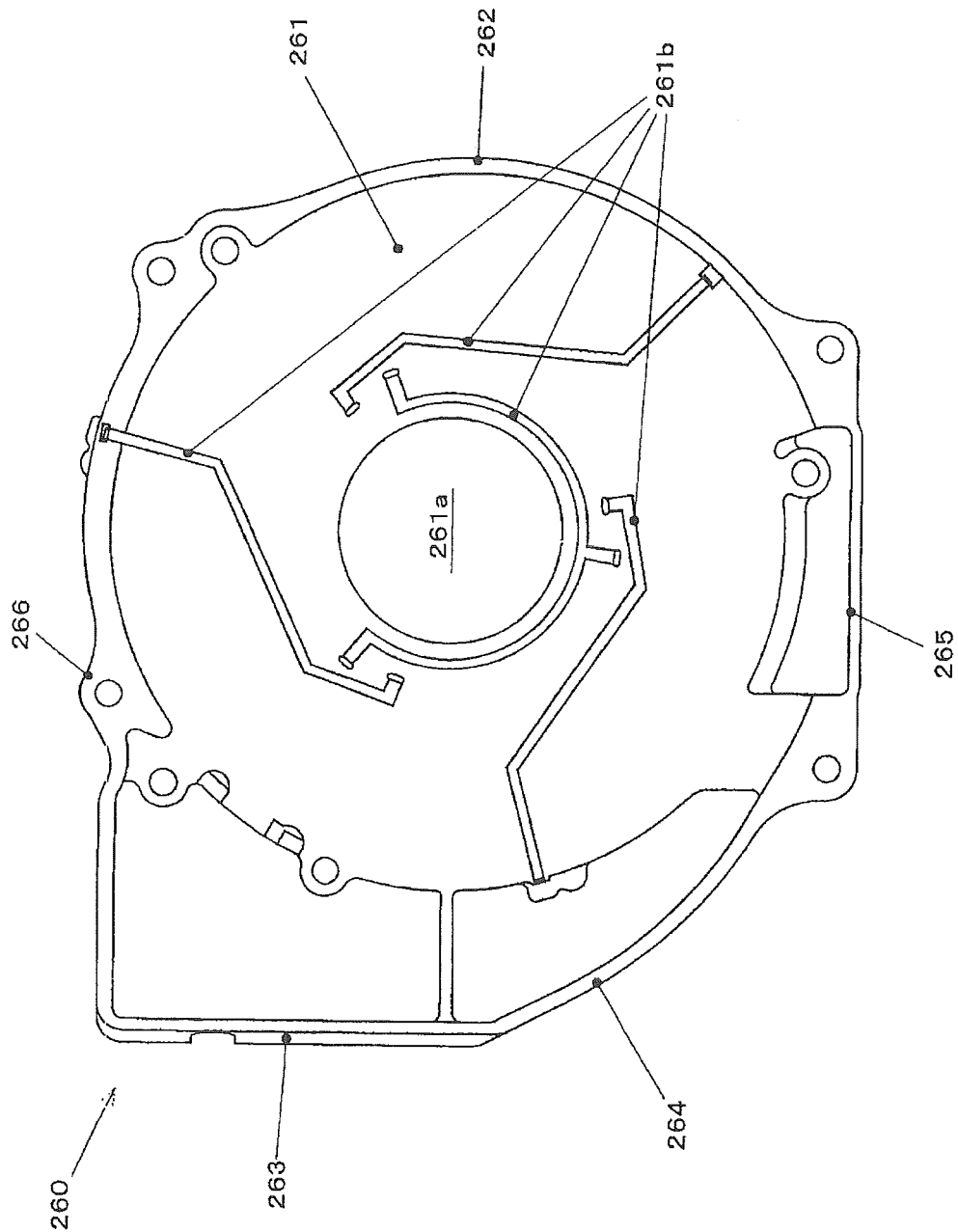
FIG. 9 is a diagram of the second housing of the power generator of FIG. 1, as viewed from a flywheel side.

FIG. 9 is a diagram illustrating the second housing 260, viewed from the flywheel 160.

The second housing 260 is provided, for instance, with a disc 261, a peripheral wall 262, a first duct 263, a second duct 264, a third duct 265, fasteners 266, a connector fitting holder 267, and connectors 268, are formed substantially in the same way as the disc 251, the peripheral wall 252, the first duct 253, the second duct 254, the third duct 255, the fasteners 256, the connector fitting holder 257, and the connectors 258 of the first housing 250.

The first housing 250 and the second housing 260 have the function of guiding air that is generated by the blower fan 170 to various sites of the engine 100 and the power generator 200.

These features are explained in detail below.

FIG. 10 is a diagram illustrating the engine and the power generator, in a state where the blower housing is removed, as viewed from the blower fan side.

FIG. 10 illustrates the first duct 263, the second duct 264 and the third duct 265 of the second housing 260. The arrangement and shape of the first duct 253, the second duct 254 and the third duct 255 of the first housing 250 are substantially identical to those of the foregoing, when viewed in the center axis direction of the crankshaft 150.

Figure 11:
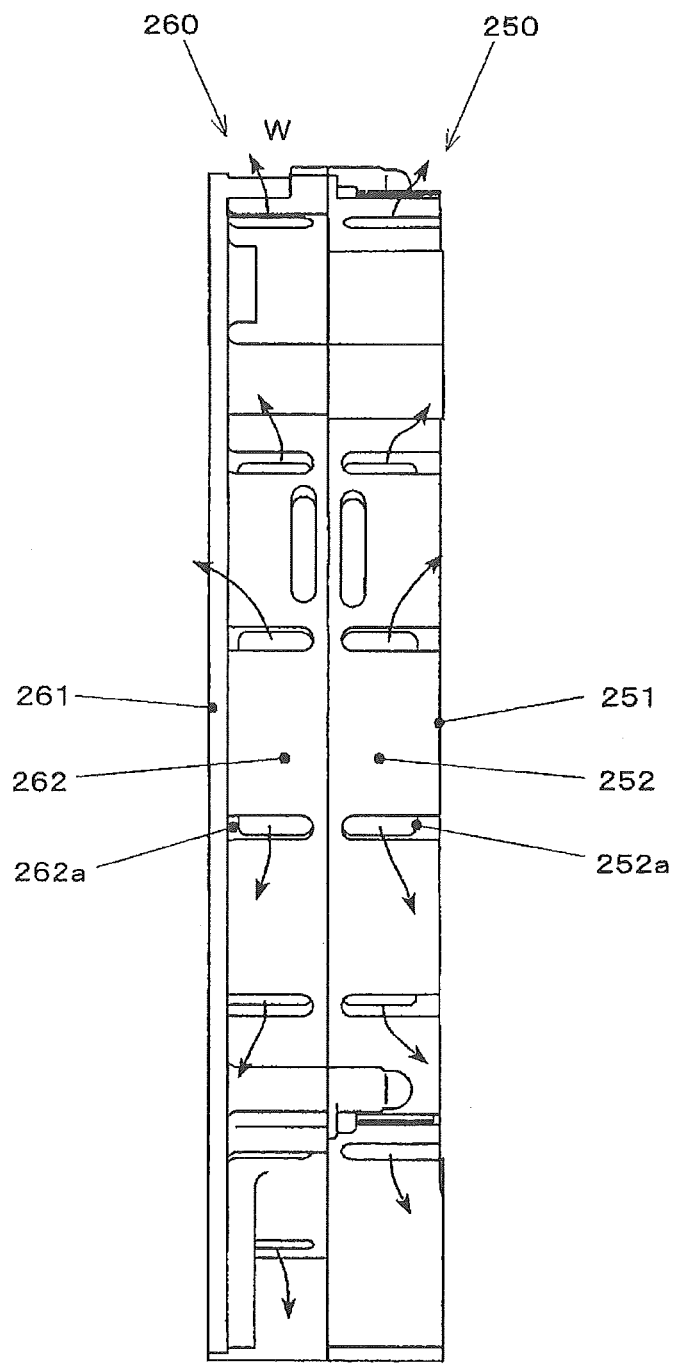
FIG. 11 is a diagram of the power generator of FIG. 1, viewed sideways.

FIG. 11 is a side-view diagram of the power generator.

The blower fan 170 rotates clockwise in FIG. 10, compresses outside air that is taken in through the central portion, and the air flows thereupon clockwise in the form of a swirl and is blown to the outer diameter side.

The first ducts 253 and 263 guide cooling air W generated by the blower fan 170 to a region on the power generator 200 side of the cylinder 130 and the cylinder head 140.

The first ducts 253 and 263 are disposed at positions overlapping the cylinder 130, when viewed in the center axis direction of the crankshaft 150.

The first ducts 253 and 263 are formed integrally with the lateral portion, on the cylinder 130 side, of the vicinity of the top of the first housing 250 and the second housing 260.

Part of the peripheral walls 252 and 262 makes up part of the first ducts 253 and 263.

Cooling air coming out of the slits 252a and 262a that are formed in that region is blown into the first ducts 253 and 263.

Although the cooling air generated by the blower fan 170 creates positive pressure in the interior of the first ducts 253 and 263, the cooling air from the slits 252a and 262a is blown out from inside the first and second housings 250 and 260 on account of the Venturi effect derived from the flow rate of the cooling air that flows through the first ducts 253 and 263.

The second ducts 254 and 264 are disposed below the first ducts 253 and 263.

The second ducts 254 and 264 guide cooling air W generated by the blower fan 170 to a region, of the cylinder 130 and the cylinder head 140, on the side opposite the power generator 200 side.

The cooling air W coming out of the second ducts 254 and 264 is guided to a predetermined region of the cylinder 130 and the cylinder head 140 by way of, for instance, an air guide plate not shown.

One same face (member) is shared by the lower faces of the first ducts 253 and 263 and the top faces of the second ducts 254 and 264.

The third ducts 255 and 265 are disposed at the lower ends of the first housing 250 and the second housing 260.

As illustrated in FIG. 1, the third ducts 255 and 265 guide cooling air W generated by the blower fan 170 to between the disc 251 and the crankcase 110, and to the lower face of the crankcase 110.

Part of the peripheral walls 252 and 262 makes up part of the third ducts 255 and 265.

Cooling air coming out of the slits 252a and 262a that are formed in this region is blown into the third ducts 255 and 265.

As illustrated in FIG. 1, part of the cooling air W that is jetted by the blower fan 170 flows, on account of the pressure thereof, from the outer peripheral side of the flywheel 160 into the spacing between the flywheel 160 and the disc 262 of the second housing 260, flows towards the inner diameter side, and flows into the housing 260 by way of the opening 262a.

The recess 162 formed in the flywheel 160 functions herein as a channel of the cooling air W.

The cooling air W that flows into the second housing 260 is caused, by the centrifugal force elicited through rotation of the rotor 210, to flow towards the outer diameter side, via the spacings between the coils C of the second stator 230, as illustrated in FIG. 3, and is then discharged out of the peripheral wall 262, through the slits 262a, as illustrated in FIG. 4 and FIG. 11.

Part of the cooling air W that flows into the second housing 260 flows towards the first housing 250 by way of the openings that are provided in the spacings of the spokes 243 of the adapter 240, and in a similar way, cools the coils C of the first stator 220 and to be discharged out of the peripheral wall 252, through the slits 252a.

As explained above, this implementation can elicit the following effects.

(1) Each connector fitting M is held on the first and second housings 250 and 260 that are made of a resin, and winding ends of the coils C are inserted into respective clamps of the connector fittings M. Accordingly, the coils can be wired as a result of a simple operation, without resorting, for instance, to any insulation operation or removal of wiring coating.

No insulating coating or the like need be provided in the connector fittings M. Therefore, wiring can be laid out in a compact manner, by disposing the connector fittings M in a tight arrangement.

The coils C can be removed easily just by unfixing the coils C and by pulling the winding ends from the clamps of the connector fittings M, also upon occurrence of anomalies such as breakage of some of the coils C, insulation failure or the like.

(2) The connector fittings M alone are used for connecting the coils C to each other, without resorting to any coated wires or the like. The above-described effect can be further promoted as a result.

(3) The connectors 258, 268 for wiring the electric circuits respectively formed in the first and second housings 250 and 260 are formed at sites such that the first and second housings 250 and 260 match each other. Accordingly, closing of the first housing 250 and the second housing 260 can be performed simultaneously up to connection of the electric circuits respectively formed in the first housing 250 and the second housing 260. Workability of an assembly operation is enhanced thereby.

(4) The connector fittings M are configured so as to fit into grooves that are formed in the first and second housings 250 and 260. As a result, the connector fittings M can be reliably held on the first and second housings 250 and 260 by resorting to a simple configuration.

The connector fittings M are disposed on the inner face side and the outer face side of the first and second housings 250 and 260. The design of the power generator 200 can be made as a result yet more compact.

(Variation)

The present invention is not limited to the implementation explained above, and may accommodate all manner of variations and modifications that lie within the technical scope of the invention.

The shape, structure, arrangement, materials, production method and so forth of the various members that make up the axial gap-type power generator and the engine are not limited to those of the above-described implementation, and may be modified as appropriate.

In the implementation, for instance, the rotor is configured through magnetization of one magnetic body plate according to a predetermined pattern, but may be alternatively configured in the form of a plurality of permanent magnets that are fixed to a holding member.

The shape and configuration of the coils that are provided in the stators are likewise not limited.

In the implementation, for instance, flat wire coils are utilized, but other types of coil may be used as well.

In the implementation, wire connection between all coils and external output are accomplished using the connector fittings M, but the invention is not limited thereto. For instance, wiring that relies on coated wires or the like may be partially provided in the axial gap-type power generator.

The invention claimed is:

1. An axial gap-type power generator, comprising:
a rotor fixed to a crankshaft of an engine;
a stator fixed to a crankcase of the engine and opposing the rotor across a spacing in an axial direction; and
a housing to house the rotor and the stator and to fix the stator,
wherein the stator is configured by arraying, in a peripheral direction, a plurality of coils each configured through winding of a winding about a stator core, the housing is formed of a resin-based material,
winding ends of the coils are wired using connector fittings, each of the connector fittings is formed of a metal plate, and is held on the housing, wherein the winding end is inserted and clamped into a clamp of the connector fitting;
the stator has a first stator and a second stator that are disposed flanking the rotor in a rotation axial direction;
the housing is configured by combining a first member for holding the first stator and a second member for holding the second stator; and
an electric circuit provided on the side of the first member and an electric circuit provided on the side of the second member are wired to each other by way of a connector that is formed integrally with a joint of the first member and the second member.

2. The axial gap-type power generator according to claim 1, wherein the coils are connected to each other through insertion of a winding end of one coil into one clamp of each connector fitting that has clamps at both ends, and through insertion of a winding end of another coil to another clamp.

3. The axial gap-type power generator according to claim 1, wherein the connector fittings are fitted in recesses that are respectively formed in an inner face side and an outer face side of the housing.

4. An axial gap-type power generator, comprising:
a rotor fixed to a crankshaft of an engine;
a stator fixed to a crankcase of the engine and opposing the rotor across a spacing in an axial direction; and
a housing to house the rotor and the stator and to fix the stator,
wherein the stator is configured by arraying, in a peripheral direction, a plurality of coils each configured through winding of a winding about a stator core,
the housing is formed of a resin-based material,
winding ends of the coils are wired using connector fittings, each of the connector fittings is formed of a metal plate, and is held on the housing, wherein the winding end is inserted and clamped into a clamp of the connector fitting; and
the connector fittings are fitted in recesses that are respectively formed in an inner face side and an outer face side of the housing.

5. The axial gap-type power generator according to claim 3, wherein the coils are connected to each other through insertion of a winding end of one coil into one clamp of each connector fitting that has clamps at both ends, and through insertion of a winding end of another coil to another clamp.

6. The axial gap-type power generator according to claim 4, wherein the coils are connected to each other through insertion of a winding end of one coil into one clamp of each connector fitting that has clamps at both ends, and through insertion of a winding end of another coil to another clamp.

* * * * *